2,750,384
ALKYLATION REACTIONS

Rex D. Closson, Detroit, Alfred J. Kolka, Birmingham, and Waldo B. Ligett, Pontiac, Mich., assignors to Ethyl Corporation, New York, N. Y., a corporation of Delaware No Drawing. Application May 23, 1952,
Serial No. 289,662

4 Claims. (Cl. 260—290)

This invention relates to alkylation of heterocyclic compounds and more particularly to a new and novel reaction between heterocyclic compounds and olefins wherein alkylated derivatives of heterocycles are produced.

Of the few methods heretofore proposed for preparation of alkyl heterocyclic compounds, none is feasible for commercial adaptation. For example, one method of preparing higher alkyl pyridines comprises reacting α-picoline with sodamide to replace one of the hydrogens on the methyl group with sodium and reacting the thereby-formed sodium derivative with an alkyl halide to form the corresponding alkyl derivative. This method is impractical in that it requires stoichiometric quantities of expensive condensing agents such as sodamine and also requires use of the relatively expensive alkyl halides. Another proposed method comprises treatment of pyridine with Grignard reagents to form α-alkyl or -aryl pyridines. This method is likewise deficient in that it requires stoichiometric quantities of Grignard reagents and also suffers the limitation that the entering group is always attached to the ring position alpha to the heteroatom. A third method comprises treating methyl pyridines with formaldehyde to produce β-(pyridyl)-ethanols, dehydrating this to the corresponding vinylpyridine and hydrogenating to ethylpyridine. This sequence is objectionable in that an undue number of separate reaction steps is required.

An object of the present invention is to provide a new and novel method for the preparation of alkyl-substituted heterocyclic compounds. A further object is to provide a new and novel method for preparation of alkyl-substituted nitrogen heterocyclic compounds. An additional object is to provide a new and novel process for the alkylation of saturated hydrogen-bearing carbon atoms alpha to an aromatic-type ring in heterocyclic compounds. A still further object is to provide a process for the alkylation of a saturated hydrogen-bearing carbon atom alpha to a six-membered aromatic-type nitrogen-containing ring.

We have discovered a new reaction whereby heterocyclic nitrogen compounds having alpha to a six-membered aromatic-type ring a hydrogen-bearing saturated carbon atom is readily and smoothly converted to products wherein one or more of the hydrogens on said alpha carbon atom is replaced by an alkyl group by reacting said heterocyclic compound with an olefin in the presence of an alkali metal-containing catalyst. By "aromatic-type ring" we mean rings of the type conventionally represented as having three alternating double bonds, as for example the pyridine ring.

As an example of a process within the scope of our invention, α-picoline reacts with ethylene as shown by the following equation:

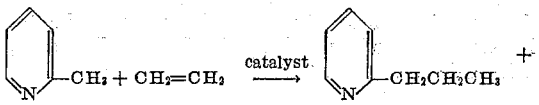

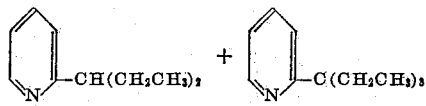

The extent to which each of the products is formed is determined by appropriate control of reaction variables; such as pressure and relative quantities of the reactants. Higher pressures and higher ratios of olefin to heterocycle favor maximum formation of the more highly alkylated products, and lower pressures and lower ratios of olefin to heterocycle favor maximum formation of lower alkylated materials.

Suitable heterocyclic compounds comprise those containing a six-membered aromatic-type ring having one or more nitrogen atoms as a member thereof and having alpha to an aromatic-type ring a hydrogen-bearing saturated carbon atom. Typical examples include alkyl pyridines such as 2-, 3-, and 4-picoline; 2,3-, 2,4-, 2, 5-, 2,6-, 3,4- and 3,5-lutidines; 2,3,4-, 2,3,5-, 2,3,6-, 2,4,5-, 2,4,6- and 3,4,5-collidines; tetramethyl pyridines; ethyl-, diethyl-, triethyl- and tetraethylpyridines; n-propyl- and di-n-propylpyridines; isopropyl-, diisopropyl- and triisopropylpyridines; n-butylpyridines; sec-butylpyridines, and the like. Further examples include alkyl pyridazines such as methylpyridazines; di- and trimethylpyridazines; ethyl-, propyl-, n-butyl-, sec-butyl-, isobutylpyridazines, and the like; alkyl pyrimidines, alkyl pyrazines, alkyl quinolines, alkyl isoquinolines, alkyl acridines, alkyl phenanthridines, alkyl phenanthrolines, alkyl phenazines, and the like. The alkyl groups referred to in each case are those having at least one hydrogen atom on the carbon atom alpha to the ring. Alkylation can occur on hydrogen-bearing saturated carbon atoms alpha to either a heterocyclic ring or a benzenoid ring. In the quinoline series, for example, 2-, 3- or 4-methylquinoline can be alkylated to give products in which alkylation occurs on carbon atoms attached to the heterocyclic ring, whereas 5-, 6-, 7- or 8-methylquinoline alkylate on hydrogen-bearing saturated carbon atoms alpha to the benzenoid ring. Compounds such as 3,8-diethylquinoline alkylate on hydrogen-bearing saturated carbon atoms alpha to either the heterocyclic or the benzenoid ring, or both.

Olefins generally are satisfactory as alkylating agents in our invention. Preferably we employ acyclic mono-olefins of twelve or less carbon atoms. Examples of our preferred alkylating agents are ethylene, propylene, butene-1, butene-2, pentene-1, pentene-2, hexene-1, hexene-2, hexene-3, the various acyclic heptenes, octenes, nonenes, decenes, undecenes, dodecenes, isobutylene, 3-methylheptene-1, 2-ethylpentene-1, 3-methylhexene-3, and the like. An especially preferred olefin in our invention is ethylene.

In addition to these preferred olefins other olefinic matreials such as cyclic olefins, polyolefins and mono-olefins of more than 12 carbon atoms can also be employed. Typical examples include cyclohexene, cyclopentene, 1,4-cyclohexadiene, 1,5-hexadiene, 1,4-hexadiene, 1,3-butadiene, pentadecene-1, other pentadecenes and tetradecenes.

Thus, in carrying out our invention we react, for example, α-picoline with ethylene and obtain α-n-propylpyridine, 3-(2-pyridyl)-pentane and 3-(2-pyridyl)-3-ethylpentane. We can control our reaction conditions, as described above, to obtain any or all of these products. Similarly, β- and γ-picolines react with ethylene to form the corresponding 3- and 4-pyridyl products. Likewise, methylpyridazines react with ethylene to form propylpyridazines and the corresponding higher ethylated products. The same general pattern is followed with the methylquinolines, pyrazines, isoquinolines, acridines and other alkylated starting materials of our invention. Monoethylpyridines react with ethylene to form 2-(pyridyl)-butanes and 3-(pyridyl)-3-methylpentanes. Ethylated derivatives of the other heterocyclics of our invention alkylate in the same manner. With methylpyridines and propylene the products are 1-(pyridyl)-2-methylpropanes and 3-(pyridyl)-2,4-dimethylpentanes. When starting with di-, tri-, or higher alkylated heterocyclics a variety of products is obtained. For example, beginning with 2,6-lutidine and ethylene we obtain 2-n-propyl-6-methylpyridine, 2 - (3 - amyl) - 6 - methylpyridine, 2 - (3 - ethyl-3-amyl)-6-methylpyridine, 2,6-di-n-propylpyridine, 2-n-propyl-6-(3-amyl)-pyridine, 2 - n - propyl - 6 - (3 - ethyl-3-amyl)-pyridine, 2,6-(di-3-amyl)-pyridine, 2-(3-amyl)-pyridine, 6-(3-ethyl-3-amyl)-pyridine and 2,6-di-(3-ethyl-3-amyl)-pyridine. Similarly, with the other starting materials of our invention, like mixtures of products which can be separated by conventional means such as fractionation are obtained.

The catalysts employed in our invention comprise alkali metal-containing substances, preferably non-oxygenated alkali metal substances which are characterized by being reactive towards water. The catalysts of our invention may also be described as alkali metal substances containing as the sole metal constituent an alkali metal, containing no non-alkali metal substituent of atomic number greater than seven, and containing no non-aromatic unsaturation other than carbon-to-carbon unsaturation. Broadly, compounds of this type fall into two general classes, the first being alkali metals themselves (lithium, sodium, potassium, rubidium and cesium), and the other alkali metal compounds containing as the sole metallic constituent an alkali metal, containing as non-metallic constituents elements with a maximum atomic number of seven, and containing no non-aromatic unsaturation other than carbon-to-carbon unsaturation. Within this group fall the alkali metal hydrides such as sodium hydride, lithium hydride, potassium hydride, rubidium hydride and cesium hydride; alkali metal amides such as sodamide, lithium amide, potassium amide, rubidium and cesium amides; substituted amides such as N-sodio-aniline, N-sodio-N-methylaniline, α-sodiopicolines, α-potassiopicoline, N-sodium-n-butylamine, N-sodioethylamine and the like; and organo-alkali metal compounds such as ethyl sodium, butyl lithium, amyl sodium, amyl potassium, benzyl sodium, benzyl potassium, phenyl sodium, phenyl potassium, phenyl lithium, and the like.

Since oxygen reacts destructively with our catalysts, it is preferable that the alkylation reaction be carried out in substantially oxygen-free surroundings, and that reactants employed should be low, preferably below about 0.5 per cent, in oxygen content. However, our catalysts are effective oxygen scavengers and can be employed in the presence of greater quantities of oxygen, if the catalyst is present in amount in excess of the quantity consumed by oxygen.

The amount of catalyst to be employed is dependent to some extent upon the pressure of operation. At higher pressures somewhat smaller amounts of catalyst can be used than are preferable at lower pressures. Generally the amount of catalyst used should be about 0.01 to 10 per cent by weight of the amount of heterocyclic compound used, with best results obtained when the amount of catalyst is between 0.1 and 5 per cent by weight of the amount of heterocyclic compound.

Our reaction is operable at temperatures ranging from about 50 to 350° C. For best results it is preferred to operate at temperatures in the range of about 100 to 200° C.

Our invention is operable at any pressure within equipment limitations. For best results we prefer to operate at pressures from about 10 to 2,000 atmospheres.

Our process is equally applicable to the alkylation of mixtures of heterocyclic compounds with olefins, and to the alkylation of heterocyclic compounds with mixtures of olefins, and to alkylation of mixtures of heterocyclic compounds with mixtures of olefins. In these cases, mixtures of products which can be separated if desired by customary means, such as fractionation, are obtained.

The ratio of alkylating agent to heterocyclic compound can be varied over a wide range. Usually it is preferable to employ an excess over the stoichiometric amount of alkylating agent, but in some cases, as when monoalkylation of a heterocyclic compound capable of polyalkylation is desired, it may be preferable to operate with a stoichiometric deficiency of alkylating agent.

Although we prefer to alkylate a substantially undiluted heterocyclic compound with a substantially undiluted alkylating agent, it is within the scope of our invention to conduct our reaction with either or both of our reactants dissolved in a solvent. The solvent should be one which is inert to the alkylation reaction and which is substantially inert to attack by our alkali metal-containing catalysts. Paraffins, cycloparaffins, and aromatics and aromatic-type heterocycles containing no hydrogen-bearing carbon atoms alpha to an aromatic nucleus are examples of suitable solvent types. Specific examples include n-octane, isooctane, cyclohexane, benzene, tert-amylbenzene, pyridine, quinoline, and tert-heptylbenzenes. Also one or more of the reaction products can be employed as the solvent.

In commercial operation it is particularly attractive to conduct our process in a continuous manner. Continuous operation of our process can be carried out by a variety of techniques, one of the most important of which comprises passing the reactants either in liquid or vapor state together with catalyst through a "hot tube" maintained at elevated temperature. This embodiment may be carried out at atmospheric pressure, elevated pressure, or even sub-atmospheric pressure. The product stream can be purified by conventional means such as distillation in a continuous fractionation column. Another means of continuous operation comprises passing the reactants and catalyst through an overflow-type autoclave or a series of overflow-type autoclaves. These and other continuous modifications of our invention can be carried out either "once-through" or with recycle of reactants, catalyst and products. In continuous and batch modifications of our invention, the reactants can be diluted with inert gases, such as propane, ethane, methane, nitrogen, helium, neon and the like.

The following examples will serve to further illustrate the scope and benefits of our invention.

*Example 1*

A pressure autoclave having a removable cap for charging and discharging liquids and solids, equipped with a plurality of gas inlet and outlet lines, thermocouples, and pressure gauges and fitted with a mechanical agitator was flushed with nitrogen and charged with 325 parts of α-picoline and 57 parts of 2-pyridyl methyl sodium in the presence of n-hexane as an inert diluent. The autoclave was closed, heated to 100° C. and pressured to 20 atmospheres with ethylene. While gradually increasing the temperature to 160–170° C. and increasing the pressure to the range 24–37 atmospheres by occasional re-pressuring with ethylene, the reaction was stirred for 1.5 hours. During this period a total pressure drop of 8.5 atmospheres was observed. At the end of this time the autoclave was permitted to cool to room temperature, vented, and the catalyst remaining destroyed with slightly more than the theoretical quantities of ethanol and water. The reaction mixture was then filtered and distilled through a helices-packed fractionating column at atmospheric pressure. After obtaining a fraction of 160 parts of unreacted α-picoline a fraction of 77 parts (16 per cent yield) of α-(n-propyl)-pyridine, boiling point 168–170° C./745 mm., refractive index $n_D^{20}$ of 1.4930, was obtained. Further fractionation led to 25 parts (4.2 per cent) of 3-(α-pyridyl)-pentane, boiling point 192–193° C./745 mm., refractive index $n_D^{20}$ of 1.4949.

When this reaction is carried out at temperatures as low as 50° C. and as high as 350° C. satisfactory results are obtained. Satisfactory results are also obtained when the pressure is varied between the range 10 atmospheres to 3000 atmospheres.

When the procedure of Example I is repeated using as catalysts sodamide, potassium amide, lithium amide, N-sodio aniline, N-potassium aniline, N-lithium-n-butylamine and the like, equally satisfactory results are obtained.

Similar results are obtained in this procedure when the alkylation is carried out with other olefins, such as propylene, isobutylene, butene-1, butene-2, and the like.

*Example II*

The procedure of Example I is carried out using as the catalyst metallic sodium. Good yields of α-(n-propyl)-pyridine and 3-(α-pyridyl)-pentane are obtained.

The procedure of Example II, when repeated using lithium, potassium, cesium or rubidium in place of the sodium, gives similar results. This procedure can be varied over a temperature range of 50 to 350° C. and a pressure range of 10 to 3000 atmospheres with satisfactory results.

*Example III*

The procedure of Example I is repeated using as the catalyst sodium hydride. Similar results are obtained.

Substitution of lithium hydride, potassium hydride, cesium hydride, and rubidium hydride in the procedure of Example III provides good yields of the alkylated products.

*Example IV*

The procedure of Example I is repeated except that the catalyst is benzyl sodium. Alkylation proceeds with substantially the results obtained in Example I.

When other organo-alkali metal catalysts such as amyl sodium, benzyl potassium, cumyl sodium, butyl sodium, butyl lithium, amyl cesium, phenyl sodium, phenyl potassium and the like are used good results are obtained.

The procedures of Examples I to IV, when applied to other heterocyclic compounds falling within the scope of our invention such as dimethyl pyridines, ethyl pyridines, alkyl quinolines, and isoquinolines, alkyl pyradizines, alkyl pyrimidines, alkyl pyrazines, alkyl acridines, alkyl phenanthridines, and the like, result in alkylation in the manner described above and result in good yields of the various alkylated products. In cases where mixtures are obtained, these can be separated by customary means such as fractional distillation or crystallization. Like results are achieved when the procedures of Examples II, III and IV are repeated with the other olefins of our invention, such as propylene, isobutylene, butene-1, butene-2, pentenes, hexenes, heptenes, octenes, nonenes, decenes and the like. With certain higher-boiling heterocycles the process can be carried out at atmospheric pressure.

The compounds of our invention are useful as chemical intermediates, as pharmaceutical materials, as agricultural chemicals such as insecticides, fungicides and the like, as intermediates for synthesis of vitamins and other nutrient materials, etc.

We claim:

1. A process for preparing a pyridine with a saturated alkyl substituent, said process comprising reacting a pyridine having an alkyl group containing a hydrogen-bearing carbon atom alpha to the pyridine ring, with an acyclic monoolefin of up to 12 carbon atoms in the presence of an alkali metal-containing catalyst selected from the group consisting of alkali metals, their hydrides, amides, and organo compounds, said alkylation reaction being conducted at a temperature of 50 to 350° C. and a pressure of 10 to 2000 atmospheres to cause the olefin to add to said alkyl carbon atom.

2. The process of claim 1 in which the catalyst is an organo-alkali metal compound.

3. Process for the alkylation of α-picoline comprising reacting α-picoline with ethylene in the process of α-pyridyl methyl sodium at a temperature of 50–350° C. and a pressure of 10 to 2,000 atmospheres.

4. Process for the ethylation of α-picoline, comprising reacting α-picoline with ethylene in the presence of catalytic quantities of α-pyridyl methyl sodium at temperatures of 100–170° C. and pressures of 20–37 atmospheres.

References Cited in the file of this patent

UNITED STATES PATENTS

| | | |
|---|---|---|
| 2,141,611 | Malishev | Dec. 27, 1938 |
| 2,505,461 | Cislak et al. | Apr. 25, 1950 |

OTHER REFERENCES

Bergstrom et al.: "Jour. Org. Chem.," September 1945, pp. 452–57.

Wegler et al.: Chem. Abst., vol. 44, p. 5358 (1950).